Sept. 18, 1934. L. F. DETTENBORN Re. 19,315

WOODWORKING MACHINE

Original Filed July 7, 1932 2 Sheets-Sheet 1

Inventor

Louis F. Dettenborn

By R. Clay Lindsey

Attorney

Sept. 18, 1934. L. F. DETTENBORN Re. 19,315

WOODWORKING MACHINE

Original Filed July 7, 1932 2 Sheets-Sheet 2

Inventor
Louis F. Dettenborn

By T. Clay Lindsey.
Attorney

Reissued Sept. 18, 1934 Re. 19,315

UNITED STATES PATENT OFFICE 19,315

WOODWORKING MACHINE

Louis F. Dettenborn, Hartford, Conn.

Original No. 1,955,951, dated April 24, 1934, Serial No. 621,225, July 7, 1932. Application for reissue July 11, 1934, Serial No. 734,644

9 Claims. (Cl. 144—145)

This invention relates, generally to woodworking machines and has particular reference to a machine for contouring or shaping the peripheries of pieces or members of wood and the like.

The aim of the invention is to provide an improved machine having various features of novelty and advantage, and by the use of which pieces of work of superior character may be turned out more rapidly and at a lower cost than has heretofore been possible.

A further aim of the invention is to provide an improved machine of this sort which is characterized by its extreme simplicity in construction and arrangement, by its ruggedness and compactness, by its low cost of manufacture, by its efficiency in operation, and by the ease and facility with which it may be set up to operate upon pieces of work of various kinds and shapes.

A further object of the invention is to provide an improved work holding attachment adapted to be applied to vertical contouring or shaping machines now on the market.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein I have shown, for illustrative purposes, one embodiment which the present invention may take, Fig. 1 is a front elevational view of my improved attachment applied to a shaping machine;

Figure 1:
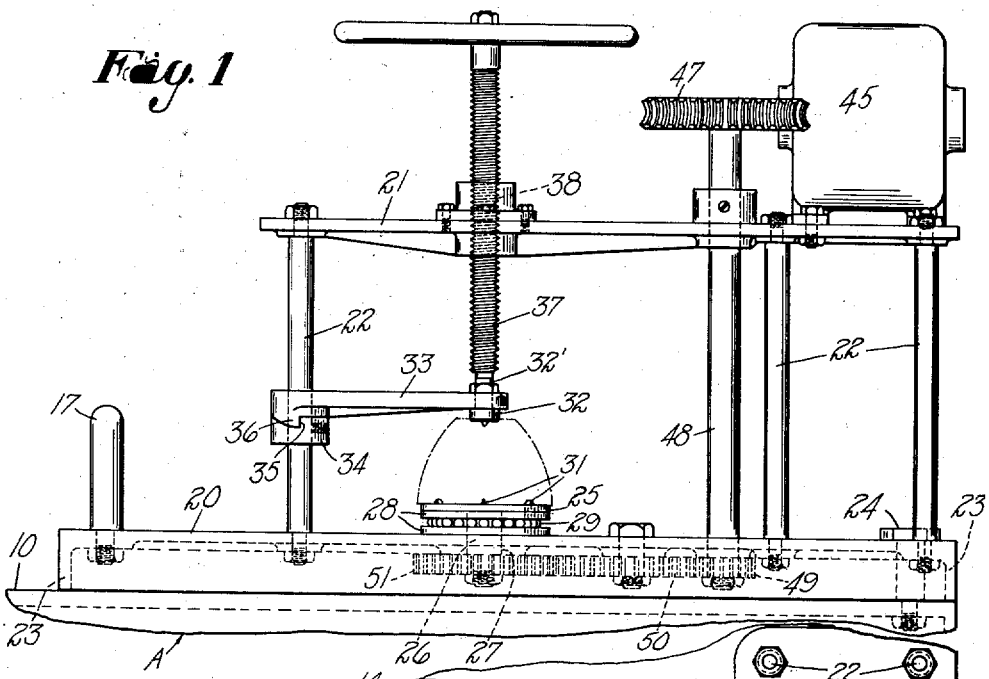
Figure 2:
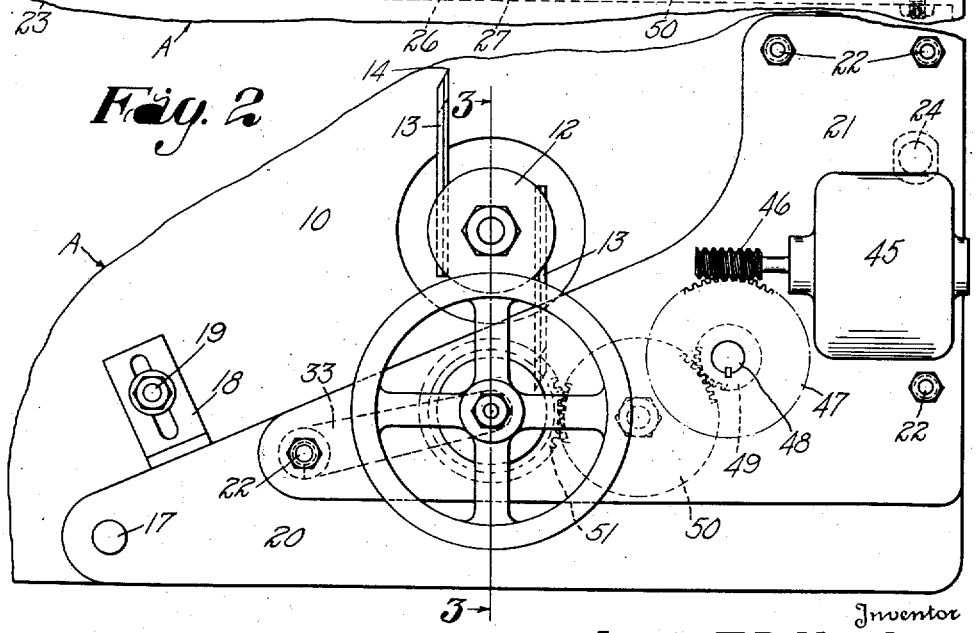
Fig. 2 is a top plan view thereof.
Figure 3:
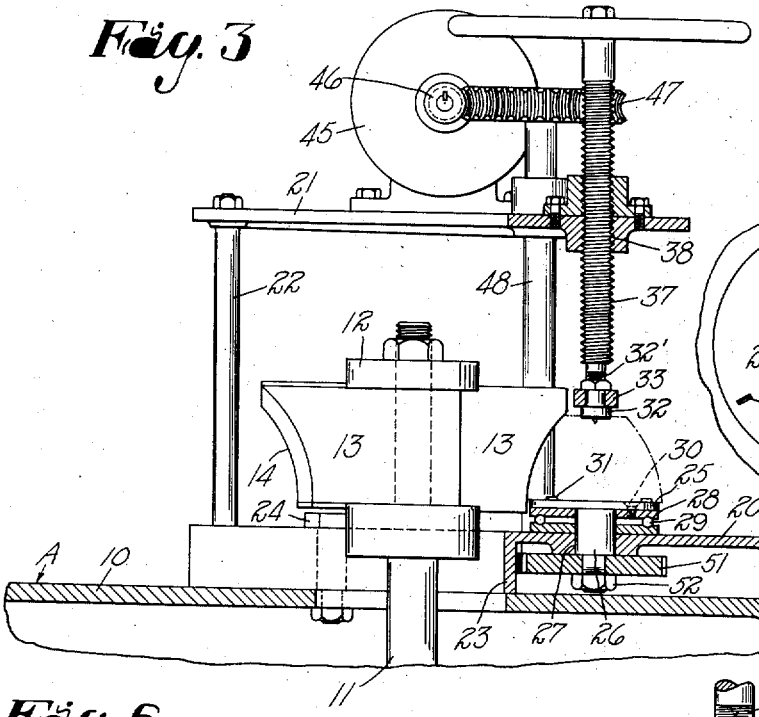
Fig. 3 is a sectional view taken substantially on line 3—3 of Fig. 2.
Figure 4:
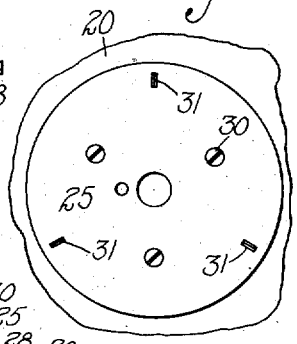
Fig. 4 is a top plan view of the rotatable work holder or head.

Referring to the drawings in detail, A denotes, generally, the bed of a contouring machine, the same having a horizontally disposed top 10 through which extends a vertically disposed tool spindle 11 which may be driven in any suitable manner at a relatively high speed, the driving means not being shown as it may take any suitable form. Secured to the upper end of this spindle is a tool head comprising a pair of collars 12 and provided with a pluraltiy of removable shaper blades 13, each having a cutting edge 14. The contouring tool may be of any suitable type or configuration, that shown in the drawings being of a conventional construction. The shape of the cutting edges 14 will, of course, depend on the contour to be given to the work.

Referring now to the improvements of the present invention, the same includes a frame having a horizontally disposed base 20 and an upper plate 21 held in spaced parallel position above the base 20 by standards or rods 22. The base 20, in top plan, is generally in the form of of a right-angled triangle, the hypotenuse of which is disposed towards the shaper tool. The upper plate is of similar shape but of less size. The base has, at its periphery, a depending flange 23, the lower edge of which is adapted to engage and slidably rest upon the top 10 of the bed A. By providing this flange, there is a space between the top of the bed and the top of the base adapted to accommodate suitable gearing, as hereinafter described more in detail. The frame is adapted to slide upon the bed and, in the present instance, the frame is pivoted to the bed for swinging movement towards and away from the tool. The pivot between the bed and the frame may comprise a bolt 24, which, as shown most clearly in Fig. 1, is located adjacent one corner of the base 20. Located in the other corner of the base and arising therefrom is a handle 17 by means of which the frame may be swung about the pivot towards and away from the tool. The numeral 18 designates a stop in the form of a right-angled strip or plate, and this stop is adapted to be adjustably secured to the top of the bed by a bolt or screw 19. The rear edge of the base is adapted to engage this stop in order to limit the extent to which the tool cuts into the work.

Figure 5:
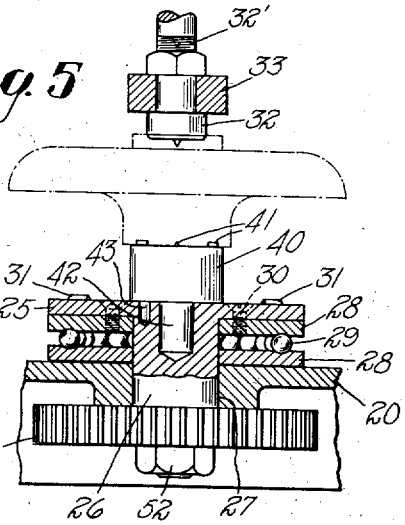
Fig. 5 is a sectional view through the rotatable head and the upper dead center.

Mounted upon the base 20 for rotary movement about a vertical axis is a work holder or head 25 in the form of a circular disk having a depending stud 26 journalled in a bearing 27 in the base. Preferably, there is interposed between the disk and the base an anti-friction bearing which may include a pair of race plates 28 and interposed balls 29, the upper race plate 28 being secured to the disk 25 as by means of screws 30. The upper surface of the disk 25 may have upwardly extending prongs or teeth 31 adapted to be embedded in the lower end of the work supported on the disk in order that the work will rotate with the disk. Positioned above the work holder 25, so as to be brought into position where it is axially aligned therewith, is a dead center 32. In the present instance, this dead center is carried by the free end of an arm 33 swingingly supported by one of the rods 22. On this rod is adjustably fixed a collar 34 having a recess 35 adapted to receive a lug 36 of the arm 33 so that, when the lug is engaged in this recess, the dead center is properly aligned with the work holding disk 25. In order to hold the dead center in operative engaged relation with the top of the work, there may be provided a screw 37 passing through a threaded opening 38 in the top plate. The lower end of this screw is adapted to engage the upper end of the stem 32' of the dead center. In some instances, it may be desirable to use an adapter on the work supporting disk in order to properly position the piece of work vertically with respect to the cutters. Such an adapter is shown in Fig. 5 and is designated by the numeral 40. This adapter 40 has a cylindrical body portion on the upper end of which are prongs or teeth 41 which serve the same purpose as the teeth 31. The body portion has a depending stem 42 and an offset pin 43 adapted to take into openings in the upper end of the rotary work support.

For the purpose of driving the rotary work supporting head, there is provided upon the top or upper plate 21, and preferably adjacent the pivot of the frame, a motor 45, the shaft of which is provided with a worm 46 meshing with the worm wheel 47 fixed to a vertical shaft 48 journalled in the top plate 21 and the base 20. On the lower end of this shaft, and located within the hollow base 20, is a gear 49 meshing with an idler 50 which, in turn, meshes with a gear 51 secured to the lower end of the stem 26, as by means of a nut 52.

The operation of the device, when used for turning out circular pieces of work, is briefly as follows: Cutters 13 having cutting edges corresponding in shape to the longitudinal shape to be given to the piece of work are selected and secured to the head 12 in the usual manner. The piece of work is centrally placed upon the top of the rotary work holder 25, the arm 33 is swung into position so as to engage the dead center against the upper end of the work, and then the screw 37 is turned down so as to prevent the dead center from moving upwardly during the cutting operation. The cutter is rotated at a relatively high speed through the usual driving means (not shown) and the work is rotated at a relatively slow speed by means of the motor 45 and through the connections illustrated. The frame is then swung rearwardly towards the tool about the pivot 24 so as to bring the periphery of the work into engagement with the rotating cutting blades. When the base engages the previously adjusted stop 18, the work is cut to the desired depth, and then the frame is swung forwardly away from the tool, the finished piece of work is removed, and another piece is positioned in its place.

Figure 6:
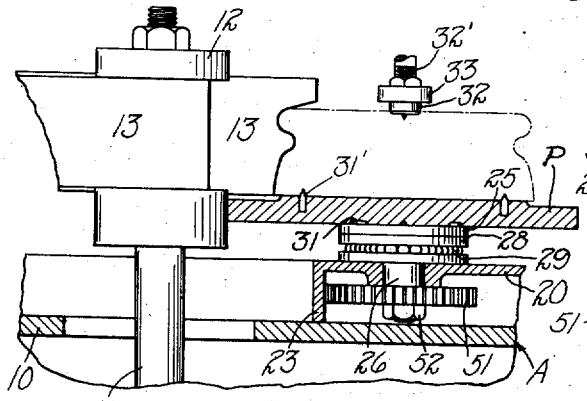
Fig. 6 is a detail view of the work holder and cutter, the work holder having a former plate or template attached thereto.
Figure 7:
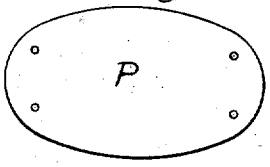
Fig. 7 is a top plan view on a reduced scale of one form of former plate.
Figure 8:
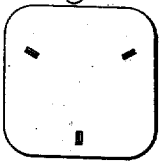
Fig. 8 is a like view of another form.

When it is desired to turn out pieces of work which are non-circular in form, a pattern or former plate (corresponding in shape to that of the finished work) is employed. As will be seen from Fig. 6, the former plate P is positioned on the disk 25 and the periphery of the plate extends beyond the periphery of the work so that the plate may engage the periphery of the lower circular collar 12 of the tool head. The former plate is held against rotation relative to the disk by the projections 31. The upper surface of the former plate is provided with pointed pins or projections 31' which are adapted to be embedded in the lower surface of the work. The former plate, which is preferably made of wood, may take any desired shape or configuration. When pieces of elliptical shape are to be made, the plate P will have a like shape, as shown in Fig. 7. In Fig. 8, the former plate is illustrated as being generally square with rounded corners. During the cutting operation, the frame is urged towards the tool, so as to keep the edge of the former plate against the collar 12 of the tool head.

It will be observed from the foregoing description, taken in connection with the accompanying drawings, that I provide a self-contained unit adapted to be supported on the top of the usual shaping machine and adapted to swing on that top towards and away from the tool. The device is extremely simple in construction and, therefore, may be manufactured and sold at a relatively low cost as compared to the very expensive machines now offered for sale for like purpose. The work may be very easily and quickly positioned on the holder and removed therefrom and, during the cutting operation, is held very securely in proper relation to the tool. The mechanism is very efficient in operation in that, by using the same, a number of pieces of work may be rapidly turned out and the finished pieces will have smooth and unblemished surfaces.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a woodworking machine for contouring pieces of wood and the like, a bed having a horizontally disposed top, a tool disposed above said top for rotary movement about a vertical axis, a frame having a base resting on said top and slidable thereon, means for pivotally connecting said base to said bed for swinging movement towards and away from said tool, a rotatable work holder journalled on said base about a vertical axis, a dead center above and opposed to said work holder, and means on said frame having a driving connection extending through said base for rotating said work holder.

2. In a woodworking machine for contouring pieces of wood and the like, a bed having a horizontally disposed top, a tool disposed above said top for rotary movement about a vertical axis; a frame having a base, an upper plate parallel to and positioned above the base, and standards between the base and upper plate, said base directly engaging and being supported for sliding movement above said top; means for pivoting said frame to said bed for swinging movement on said top towards and away from the tool, a work holder rotatably supported by said base remote from said pivot for rotary movement about a vertical axis, a motor supported by said upper plate adjacent to said pivot, and a driving connection between said motor and work holder extending between said top and said base.

3. In a woodworking machine for contouring pieces of wood and the like, a unit attachment including a frame having a horizontally disposed flanged base adapted to directly rest and slide upon the top of a bed, standards arising from the base, and a top plate supported by the standards; means for pivotally connecting the base to the bed for swinging movement towards and from a tool disposed above the bed, a rotary work holder supported by said base for rotary movement about a vertical axis, said work holder being positioned above said base and between said base and top plate, a motor supported by said top plate, a driving connection between said motor and work holder and including gears located within the base, and a handle adjacent the free end of said base for swinging the frame about its pivot.

4. In a woodworking machine for contouring pieces of wood and the like, a unit attachment including a frame having a horizontally disposed base provided with a depending marginal flange, the lower edge of which is adapted to engage and slide on the top of a bed, a work holder supported by said base for rotary movement about a vertical axis and having a depending stem journalled in the base, said work holder being positioned above said base and having an upwardly facing work supporting surface, a motor supported by the frame, a gear within said base secured to the lower end of said stem, a driving connection between said motor and gear, and means for pivotally connecting said base to the bed.

5. In a woodworking machine for contouring pieces of wood and the like, a unit attachment including a frame having a base adapted to be slidably supported for pivotal movement on the top of a bed, standards arising from the base, and an upper plate supported by said standards in parallel relation to said base; a work holder supported by the base for rotary movement about a vertical axis, a dead center opposed to said work holder, a swinging arm supporting said dead center and supported by one of said standards, a screw having a threaded bearing in said upper plate and adapted to hold said dead center in operative engaged relation with the work, a motor carried by said top plate, and a driving connection between said motor and work holder.

6. In a work holding machine for contouring pieces of wood and the like, a unit attachment including a frame having a horizontally disposed flanged base adapted to directly rest and slide upon the top of a bed, standards arising from the base, a top plate supported by the standards, means for pivotally connecting the base to the bed for swinging movement towards and away from a tool disposed above the bed, a rotary work holder positioned above said base and having a stem journaled in said base on a vertical axis, a motor supported by said frame, a driving connection from said motor to said work holder extending between said base and said bed, a dead center above and opposed to said work holder, and a screw carried by said top plate in axial alignment with said stem and adapted to hold said dead center against the work.

7. In a woodworking machine for contouring pieces of wood and the like, a bed having a horizontally disposed top, a tool disposed above said top for rotary movement about a vertical axis, a frame having a base resting on a surface provided on said top and slidable thereon, a rotatable work holder journalled on said base about a vertical axis, a dead center above and opposed to said work holder, means for guiding said frame towards and away from said tool, and means on said frame having a driving connection extending through said base for rotating said work holder.

8. In a woodworking machine for contouring pieces of wood and the like, a unit attachment including a frame having a horizontally disposed hollow base adapted to engage and slide upon a fixed surface, a work holder supported by said base for rotary movement about a vertical axis and having a depending stem journalled in said base, said work holder being positioned above the base and having an upwardly facing work supporting surface, a motor supported by said frame, a driven member within said base secured to the lower end of said stem, a driving connection between said motor and driven member and located in part in said hollow base, and means for guiding said frame towards and away from the tool.

9. In a woodworking machine for contouring pieces of wood and the like, a unit attachment including a frame having a horizontally disposed hollow base adapted to engage and slide upon a fixed surface, a work holder supported by said base for rotary movement about a vertical axis and having a depending stem journalled in said base, said work holder being positioned above the base and having an upwardly facing work supporting surface, a motor supported by said frame above said base and offset from said work holder, a gear within said base secured to the lower end of said stem, a driving connection between said motor and gear and located in part in said hollow base, a dead center on said frame disposed above and in opposed relation to said work holder, and means for guiding said frame towards and away from a tool.

LOUIS F. DETTENBORN.